(12) United States Patent
Deddo

(10) Patent No.: US 11,401,383 B2
(45) Date of Patent: Aug. 2, 2022

(54) VEHICLE EXTERIOR PROTECTIVE COATING

(71) Applicant: ECP Incorporated, Woodridge, IL (US)

(72) Inventor: Michael Anthony Deddo, Woodridge, IL (US)

(73) Assignee: ECP Incorporated, Woodridge, IL (US)

(*) Notice: Subject to any disclaimer, the term of this patent is extended or adjusted under 35 U.S.C. 154(b) by 269 days.

(21) Appl. No.: 16/387,767

(22) Filed: Apr. 18, 2019

(65) Prior Publication Data

US 2019/0322810 A1    Oct. 24, 2019

Related U.S. Application Data

(60) Provisional application No. 62/660,678, filed on Apr. 20, 2018.

(51) Int. Cl.
| | |
|---|---|
| *C08G 77/26* | (2006.01) |
| *C08L 83/08* | (2006.01) |
| *C08K 9/04* | (2006.01) |
| *C08K 3/36* | (2006.01) |
| *C08K 3/04* | (2006.01) |
| *C09D 5/14* | (2006.01) |
| *C09D 7/61* | (2018.01) |
| *C09D 7/40* | (2018.01) |
| *C09D 5/02* | (2006.01) |
| *B82Y 30/00* | (2011.01) |
| *B05D 1/02* | (2006.01) |

(52) U.S. Cl.
CPC .............. *C08G 77/26* (2013.01); *C08K 3/04* (2013.01); *C08K 3/36* (2013.01); *C08K 9/04* (2013.01); *C08L 83/08* (2013.01); *C09D 5/025* (2013.01); *C09D 5/14* (2013.01); *C09D 7/61* (2018.01); *C09D 7/67* (2018.01); *B05D 1/02* (2013.01); *B82Y 30/00* (2013.01); *C08K 2201/005* (2013.01); *C08K 2201/011* (2013.01); *C08L 2201/54* (2013.01)

(58) Field of Classification Search
CPC ... C08K 3/04; C08K 3/36; C08K 9/06; C08K 2201/005; C08K 2201/011; C08K 9/04; C09D 183/08; C09D 5/024; C09D 5/025; C09D 5/14; C09D 7/61; C09D 7/67; C09D 7/70; B05D 1/02; B05D 2201/00; B05D 2202/00; B05D 2601/22; B82Y 30/00; C08G 77/26; C08L 2201/54; C08L 83/08

See application file for complete search history.

(56) References Cited

U.S. PATENT DOCUMENTS

| | | | |
|---|---|---|---|
| 5,154,759 A | 10/1992 | Cifuentes et al. | |
| 5,782,962 A * | 7/1998 | Burke | C09G 1/10 |
| | | | 106/10 |
| 7,115,325 B2 | 10/2006 | Fujimura et al. | |
| 7,503,964 B2 * | 3/2009 | Hasinovic | C09G 1/12 |
| | | | 106/10 |
| 8,796,198 B2 | 8/2014 | Henning et al. | |
| 9,399,722 B2 | 7/2016 | Serobian | |
| 9,856,400 B2 | 1/2018 | Fish et al. | |
| 2008/0221009 A1 | 9/2008 | Kanagasabapathy et al. | |
| 2009/0297828 A1 | 12/2009 | Shenderova et al. | |
| 2010/0092765 A1 | 4/2010 | Hager et al. | |
| 2010/0119461 A1 | 5/2010 | Bicard-Benhamou et al. | |
| 2010/0197748 A1 * | 8/2010 | Schwarz | C11D 3/48 |
| | | | 514/372 |
| 2010/0239679 A1 | 9/2010 | Greene et al. | |
| 2011/0172135 A1 | 7/2011 | Dunning et al. | |
| 2011/0217544 A1 | 9/2011 | Young et al. | |
| 2015/0166835 A1 | 6/2015 | Coffey et al. | |
| 2015/0252196 A1 | 9/2015 | Jing et al. | |
| 2016/0108257 A1 | 4/2016 | Schlechte et al. | |
| 2017/0027168 A1 | 2/2017 | Heath | |

FOREIGN PATENT DOCUMENTS

| | | |
|---|---|---|
| CN | 104893444 B | 5/2017 |
| WO | 2008153687 A2 | 12/2008 |

OTHER PUBLICATIONS

Aug. 6, 2019—(WO) ISR and WO—PCT/US19/028223.
Kumar, Ramesh; Mazumder, Sonal, Transparent and Durable Superhydrophobic Coatings on Glass Using Silicone Resins and Silica Nanoparticles, Materials Focus, vol. 7, No. 1, Feb. 2018, pp. 69-77, American Scientific Publishers.
Chandra, Arup Kumar; Kumar Nalini Ranjan, Polymer Nanocomposites for Automobile Engineering Applications, SpringerLink, Properties and Applications of Polymer Nanocomposites, pp. 1-14, Apr. 10, 2018.
Khadem, Mahdi et al., Ultra-thin carbon-based nanocomposite coatings for superior wear resistance under lubrication with nano-diamond additives, RSC Advances, Issue 62, 2016, retrieved Apr. 10, 2018, pp. 1-5.
Jan. 4, 2022—(CA) Office Action—App. No. 3,097,843.

* cited by examiner

*Primary Examiner* — Shuangyi Abu Ali
(74) *Attorney, Agent, or Firm* — Banner & Witcoff, Ltd.

(57) ABSTRACT

A composition is provided comprising a high viscosity amino functional silicone fluid, a surface modified colloidal silica, and a nanodiamond slurry. The composition is characterized by providing a protective coating and enhancing the appearance of a wide variety of painted and unpainted vehicle exterior material surfaces, including rubber, vinyl, metal, metal alloys, chrome, glass, carbon fiber, aluminum, plastic made from renewable sources, and plastic made from non-renewable sources.

19 Claims, No Drawings

VEHICLE EXTERIOR PROTECTIVE COATING

PRIORITY

This application is a non-provisional of U.S. Patent Application No. 62/660,678 entitled "Vehicle Exterior Protective Coating" and filed on Apr. 20, 2018 which is incorporated by reference herein in its entirety.

FIELD OF THE INVENTION

This disclosure relates generally to a vehicle exterior protective coating suitable for protecting a wide variety of exterior surface materials used for transportation vehicles.

BACKGROUND

Exterior paint protection for vehicles has been evolving since its inception over 100 years ago. Some conventional protection products include different types of waxes, e.g., carnauba. While waxes provide some protection, that protection is typically short-lived, and application/removal of conventional wax products can be somewhat labor intensive and can be difficult to accomplish completely and evenly in relation to all exterior surfaces to for which application/removal is desired. Some later wax formulations include aminofunctional silicones. Wax formulations that include an aminofunctional silicone typically provides better long term durability and water repellency than wax formulations that do not include an aminofunctional silicone. Use of an aminofunctional silicone in wax formulations gave rise to sealant type products. Sealant type products typically last longer and are easier to apply than formulations that do not include a sealant.

Vehicle exteriors are becoming more complex each year. Original equipment manufacturers (OEM) use many different types of materials to combine aesthetics, safety, weight, and durability characteristics. Vehicle exteriors may have a combination of traditional materials, such as metal, metal alloys, rubber and vinyl, with newer materials, such as carbon fiber, aluminum, and innovative types of plastic.

Programs are sometimes provided by vehicle manufacturers and new vehicle dealerships and/or used vehicle dealerships, wherein protective coatings are applied to exterior vehicle surfaces at new vehicle dealerships and/or used vehicle dealerships. Conventional coating products, however, have disadvantages. For example, conventional coating products are not suitable to protect and/or enhance the appearance of all the different types of exterior materials used for transportation vehicles. A conventional coating product that may be suitable to protect one type of vehicle exterior material may not be suitable to protect a different vehicle exterior material. For example, conventional coatings designed to protect the painted exterior surface of a vehicle typically leave streaks and do not suitably protect and enhance the appearance of glass surfaces. Thus, at least two or more coating products are needed to protect all the different types of materials used for vehicle exteriors. This in turn, This, in turn, requires those applying protective coatings to vehicle exterior materials, e.g., new vehicle dealerships and/or used vehicle dealerships, to stock a sufficient amount of these different coating products.

Second, these different coatings must typically be applied separately from one another so that each coating is applied to the respective vehicle exterior material surfaces they are designed to protect and enhance the appearance thereof.

Third, the applying of these different coatings separately from one another typically requires the avoidance of applying the different coatings to vehicle exterior materials for which they are not designed to protect and/or enhance the appearance thereof. This may be particularly difficult when different vehicle exterior materials requiring different protective coatings are near and/or are adjacent to one another.

What are needed are more protective coating compositions and methods that do not have the limitations and disadvantages of conventional compositions and methods. It would be advantageous to have a protective coating product that is suitable for protecting and enhancing the appearance of the wide variety materials for exterior vehicle surfaces, including painted surfaces and glass. It would be advantageous to have a protective coating product that is a ready-to-use product, and is also user-friendly.

SUMMARY

In an aspect of the disclosure, a universal vehicle exterior protective coating composition and method of application is provided to protect exterior surfaces of a vehicle. In an aspect, the coating composition protects a wide variety of vehicle exterior surfaces, including glass. In an aspect, wherein the coating composition upon application and curing on a vehicle exterior surface, is characterized by providing a protective coating and enhancing the appearance of each treated vehicle exterior surface, including rubber, vinyl, metal, metal alloys, chrome, glass, carbon fiber, aluminum, plastic made from renewable sources, and plastic made from non-renewable sources.

In an aspect, the protective coating composition comprises a concentrated composition. In an aspect, upon application to and curing of the coating composition on vehicle exterior surfaces, the coating composition protects those surfaces.

In an aspect, treated surfaces will repel oil, water, and dirt, while also enhancing the appearance of the treated surfaces. In an aspect, the bonding of coating composition is so strong that the treated surfaces will withstand numerous cleanings.

In an aspect, the coating composition comprises a high viscosity amino functional silicone fluid, a surface modified colloidal silica, and a nanodiamond slurry.

In an aspect, the coating composition may be applied to exterior vehicle surfaces, including glass. In an embodiment, the exterior vehicle surfaces are cleaned before applying the coating composition.

The above and other aspects, features and advantages of the present disclosure will be apparent from the following detailed description, including various embodiments.

DETAILED DESCRIPTION

In an aspect, the coating composition comprises a high viscosity amino functional silicone fluid, a surface modified colloidal silica, and a nanodiamond slurry, and optionally a microbiocide. In an aspect, the coating composition may optionally include a fragrance and/or a dye. Because the coating composition includes a nanodiamond component and a silica component, the coating composition may also be referred to as a nanodiamond ceramic composition. The nanodiamond ceramic composition, once cured, protects and enhances the appearance of all types of vehicle exterior materials. The nanodiamond ceramic composition provides enhanced shine, gloss, slickness and reflection, creating a high brilliance finish and look, while also providing chemical bonding to vehicle exterior surfaces for long lasting performance.

In an aspect, the coating composition comprises a high viscosity amino functional silicone fluid on a substrate (e.g., APS-ME355, provided by Advanced Polymer, Inc., of Carlstadt, N.J.).

In an embodiment, the surface modified colloidal silica may have nominal silica particle sizes of about 20 nanometers. In an embodiment, the surface modified colloidal silica may have a pH at 25° C. of about 3. In an embodiment, the surface modified colloidal silica may have a silica weight percent of about 30%. In an embodiment, the surface modified colloidal silica may have viscosity at 25° C. of about 5 centipoise. In an embodiment, the surface modified colloidal silica may have a specific gravity of about 1.2. An exemplary surface modified colloidal silica may be Nyacol® DP9711, provided by Nyacol Nano Technologies, Inc. of Ashland, Mass.

In an embodiment, the nanodiamond slurry may comprise an ultradispersed diamond (UDD). The ultradispersed diamond may be formed by detonation of larger diamond particles, wherein the ultradispersed may also be referred to as detonation nanodiamond (DND). In an embodiment, the nanodiamond slurry may also comprise water, preferably deionized water. In an embodiment, the nanodiamond slurry is identified by the product identifier CAS No. 7782-40-3, in deionized water (e.g., deionized water identified by the product identifier CAS No. 7732-18-5). In an embodiment, the nanodiamond slurry may have the following composition: less than or equal to 5% by weight diamond, and greater than or equal to 95% by weight deionized water. In an embodiment, the nanodiamond slurry may be Synthetic (Detonation) Nanocrystalline diamond suspension, CAS 7732-403, in deionized water, provided by Adamas Nanotechnologies, Inc., of Raleigh, N.C.

In an aspect, the coating composition may be applied to vehicle exterior surfaces, including glass. In an aspect, the coating composition may be a ready-to-use (R.T.U.) formulation and applied to vehicle exterior surfaces or substrates as a nanodiamond ceramic coating spray. In an embodiment, exterior vehicle surfaces to be treated are first cleaned before applying the coating composition. In an aspect, the coating composition is sprayed onto the vehicle exterior surfaces and lightly buffed dry with a clean microfiber towel. Alternatively, the coating composition may be sprayed onto a high quality microfiber towel and wiped directly onto the vehicle exterior surface, followed by buffing of excess with a dry microfiber towel. The coating composition may be applied with any suitable spray apparatus, including but not -limited to the following examples:

1. A spray apparatus comprising a rotatable rotor, e.g., as disclosed in U.S. Pat. No. 9,475,071. See also the TORNADOR® product (provided by Dehn's Innovations, LLC of Dallas, Texas)—Use tool in a well ventilated area. Add product to fill line. Adjust air supply pressure to 90 psi max. Turn valve up to allow product to mist out. Evenly spray all areas to be treated. Preferably, do not oversaturate surfaces. Wear appropriate personal protection equipment (P.P.E.) to prevent health hazards from inhalation of fine mist.

2. Pump up Sprayer—Add the coating composition to fill line. Pump the sprayer 20 times to build pressure inside of container. Adjust spray pattern to finest setting. Use overlapping motion to ensure complete coverage. Apply product per directions above. Use pump sprayer as needed to maintain a consistent spray pattern and output.

3. Trigger bottle spray apparatus—Add the coating composition to fill line. Adjust spray pattern to finest setting. Hold trigger 6-8 inches from surface during application. Use overlapping motion to ensure complete coverage.

In an embodiment, the nanodiamond ceramic coating may be applied as a foam as follows. The vehicle to be treated should be washed prior to application. The foam nanodiamond ceramic coating should be shaken well before use. The foam nanodiamond ceramic coating should be diluted at a minimum of 200 mL of product to remaining balance with water in a Hydrofoamer application tool. No secondary dilution tip is needed within the Hydrofoamer application tool. If using a hand spray bottle, dilute the foam nanodiamond ceramic coating 1:50 with water in a spray bottle with a high output trigger. Apply product liberally over entire vehicle. An even coat is needed to ensure proper bonding all vehicle surfaces, including paint, glass, chrome, trim, plastic, and wheels. Allow product to penetrate the surfaces for 1-2 minutes. Thoroughly rinse all treated areas with a strong stream of water. Tight water beading should be observed. Towel dry with quality microfiber towels.

The coating composition may further comprise additional components, e.g., a fragrance, dye, and/or an antimicrobial agent or microbiocide. In an embodiment, the coating composition comprises a fragrance, e.g., a fruit scent, such as cherry (e.g., I-8607 Cherry Fragrance, made by Abstract Perfumes Inc. of Suffern, N.Y.), or passion fruit (e.g., Scent Pink Passion Fruit #72295, made by Belle Aire Creations of Mundelein, Ill.).

In an embodiment, the coating composition comprises a dye, e.g., a yellow dye (e.g., chemical name: Acid Yellow 36; product name: Keyacid™ Metanil Yellow 1955, product code: 80103651; supplied by Keystone Aniline Corporation, having its Corporate Headquarters in Chicago, Ill., and a liquid manufacturing and technical facility in Inman, S.C.) and/or an orange or brown dye (e.g., Acid Orange 024, CAS No. 1320-07-6; product name: Spectra Resorcine Brown G, product number 2.AC.002400, supplied by Spectra Colors Corporation of Kearny, N.J.), or a red dye (e.g., Acid Red 14, CAS No. 3567-69-9, supplied by Spectrum Laboratory Products Inc. of Gardena, Calif.).

In an embodiment, the coating composition comprises a microbiocide, e.g., a microbiocide comprising 5-chloro-2-methyl-4-isothiazolin-3-one and 2-methyl-4-isothiazolin-3-one (Acticide® RS, provided by Thor GmbH, of Speyer, Germany, and/or Thor Specialties, Inc., Turnbull, Conn.).

In an embodiment, the coating composition comprises a UV blocker/absorber, e.g., 3-(2H-Benzotriazol-2-yl)-5-(1,1-dimethyl ethyl)-4-hydroxybenzenepropanoic acid, C7-9-branched alkyl esters (Tinuvin® 99, provided by BASF Dispersions & Pigments Division). In an embodiment, the composition comprises a liquid hindered amine light stabilizer, e.g., a stabilizer comprising Bis(1,2,2,6,6-pentamethyl-4-piperidyl) sebacate, CAS No. 41556-26-7, and Methyl 1,2,2,6,6-pentamethyl-4-piperidyl sebacate, CAS No. 82919-37-7 (Tinuvin® 292, provided by Ciba Specialty Chemicals Inc., of Basel, Switzerland, which in 2009 was renamed BASF Performance Products Limited—BASF Group).

In an embodiment, the coating composition comprises deionized water, acetic acid (e.g., CAS No. 64-19-7), and isopropyl alcohol.

In an embodiment, the coating composition comprises polydimethylsiloxane emulsion, e.g., SM2163, supplied by Momentive Performance Materials LLC of Waterford, N.Y.

In an embodiment, the coating composition has a formulation identified in Table 1 below. The coating composition formulation set forth in Table 1 is configured to be applied as a foam nanodiamond ceramic coating as previously discussed herein. In a preferred embodiment, the coating composition formulation set forth in Table 1 is applied to vehicle exterior surfaces as a foam nanodiamond ceramic coating using a suitable foam application device, such as a Hydrofoamer application tool, as previously discussed herein.

Surprisingly, it has been found that a coating composition comprising a suitable relative amount of the high viscosity amino functional silicone fluid, the surface modified colloidal silica, and the nanodiamond slurry protects and enhances the appearance of a wide variety of vehicle exterior materials. The coating compositions disclosed in the present disclosure provide surprising results in that they protect and enhance a wide variety of vehicle exterior surfaces, includ-

TABLE 1

| Item Ref. no. | Description | % by weight in Formulation | Lbs./100 gallons |
|---|---|---|---|
| Z14680 | high viscosity amino functional silicone fluid (APS-ME355) | 98.7330 | 819.484 |
| Z15150 | surface modified colloidal silica (Nyacol ® DP9711) | 0.0100 | 0.083 |
| Z13760 | nanodiamond slurry (CAS No. 7782-40-3, in deionized water) | 0.0010 | 0.008 |
| Z71400 | microbicide comprising 5-chloro-2-methyl-4-isothiazolin-3-one and 2-methyl-4-isothiazolin-3-one (Acticide ® RS) | 0.5000 | 4.150 |
| Z18400 | Fragrance (Scent Cherry I-8607) | 0.7500 | 6.225 |
| Z16375 | Brown Dye (CAS No. 1320-07-6, Spectra Resorcine Brown G) | 0.0050 | 0.042 |
| Z12870 | Yellow Dye (Keyacid ™ Metanil Yellow 1955) | 0.0010 | 0.008 |
| | Totals | 100.0000 | 830.000 |

In an embodiment, the coating composition has a formulation identified in Table 2 below. The coating composition formulation set forth in Table 2 is configured to be applied as a ready-to-use (R.T.U.) nanodiamond ceramic coating spray as previously discussed herein. In a preferred embodiment, the coating composition formulation set forth in Table 2 is applied to vehicle exterior surfaces as a foam nanodiamond ceramic coating using a suitable foam application device, such as a Hydrofoamer application tool, as previously discussed herein.

ing traditional materials, such as rubber, vinyl, painted metals and metal alloys, chrome, and glass, and newer materials, such as carbon fiber, aluminum, and innovative types of plastic made from renewable and/or nonrenewable sources.

The coating compositions disclosed herein provide desired enhanced appearance and protection for vehicle exterior materials, which will last for years if properly maintained. Without being bound by theory, it is believed that the coating compositions disclosed herein form chemi-

TABLE 2

| Item Ref. no. | Description | % by weight in Formulation | Lbs./100 gallons |
|---|---|---|---|
| Z9960 | Deionized water (pounds) | 94.6276 | 785.409 |
| Z14690 | Glacial acetic acid (CAS No. 64-19-7) | 0.0500 | 0.419 |
| Z22170 | Isopropyl alcohol/IFA | 2.0000 | 16.600 |
| Z14750 | SM 2163/Emsil 2163 | 1.0000 | 8.300 |
| Z14680 | high viscosity amino functional silicone fluid (APS-ME355) | 2.0000 | 16.600 |
| Z11160 | UV blocker/absorber comprising 3-(2H-Benzotriazol-2-yl)-5-(1,1-dimethyl ethyl)-4-hydroxybenzenepropanoic acid, C7-9-branched alkyl esters (Tinuvin ® 99) | 0.0100 | 0.083 |
| Z11150 | liquid hindered amine light stabilizer comprising Bis(1,2,2,6,6-pentamethyl-4-piperidyl) sebacate and Methyl 1,2,2,6,6-pentamethyl-4-piperidyl sebacate (Tinuvin ® 292) | 0.0100 | 0.083 |
| Z15150 | surface modified colloidal silica (Nyacol ® DP9711) | 0.0010 | 0.008 |
| Z13760 | nanodiamond slurry (CAS No. 7782-40-3, in deionized water) | 0.0010 | 0.008 |
| Z14860 | Fragrance (Scent Pink Passion Fruit #72295) | 0.0500 | 0.415 |
| Z23001 | Red Dye (Acid Red 14, CAS No. 3567-69-9) | 0.0004 | 0.003 |
| Z71400 | microbiocide comprising 5-chloro-2-methyl-4-isothiazolin-3-one and 2-methyl-4-isothiazolin-3-one (Acticide ® RS) | 0.2500 | 2.075 |
| | Totals | 100.0000 | 830.000 | cal bonds to the applied substrate, which become chemically and wear resistant. The formed chemical bonds are hard to break once cured, and provide outstanding performance characteristics in terms of enhanced appearance, protection, and longevity.

Without being bound by theory, it is believed that the particular size of nanodiamond particles allows these small particles to fill virtually every imperfection on a vehicle exterior surface and provide exceptional long lasting benefits. Diamonds are naturally hydrophobic and cannot be wet by water, therefore there will be tight water beading on all treated vehicle exterior surfaces.

The cured coating composition provides years of protection against all types environmental attack. The cured coating composition, which may also be referred to as a nanodiamond ceramic coating, acts like an additional layer of clear coat which gives increased depth of gloss and enhanced color. The cured nanodiamond ceramic coating provides an almost nonstick layer which reduces the adhesion of dirt, grime, and bugs. The cured nanodiamond ceramic layer is extremely hydrophobic and chemically resistant.

Rinsing with water actives the ceramic part of the coating into a hydrophobic hard layer. The result is a stunning appearance with high levels of gloss, slickness, and reflection, and provides a velvety touch.

The nanodiamond ceramic coating is a versatile product that can be easily and quickly applied to all vehicle exterior surfaces, including glass, plastic trim, chrome, moldings, and wheels, for long lasting protection.

In an embodiment, the coating compositions disclosed herein may be applied to a vehicle exterior surface or substrate as a liquid nanodiamond ceramic coating and then allowed to cure. The cured nanodiamond ceramic coating, which includes a polymer resin, provides years of protection against all types environmental attack. The cured nanodiamond ceramic coating acts like an additional layer of clear coat which gives increased depth of gloss and enhanced color. The cured nanodiamond ceramic coating provides an almost nonstick layer which reduces the adhesion of dirt, grime, and bugs. The cured nanodiamond ceramic layer is extremely hydrophobic and chemically resistant.

In an embodiment, the coating compositions disclosed herein may be applied to a vehicle exterior surface or substrate as a foam nanodiamond ceramic coating. The foaming action allows the foam nanodiamond ceramic coating to easily reach and penetrate hard to reach areas and or surfaces. The foam nanodiamond ceramic coating, once cured, provides protection and enhanced appearance to intricate moldings, emblems, cracks and crevices without labor intensive effort of hand application that may be required for a liquid form. The foam nanodiamond ceramic coating may be easily foamed on to a vehicle exterior surface using a foam application device, e.g., a Hydrofoamer, and allowed to dwell for 1-2 minutes, and rinsed. The rinsing action actives the ceramic part of the coating into a hydrophobic hard layer. The result is a stunning appearance with high levels of gloss, slickness, and reflection, and provides a velvety touch.

In an embodiment, the coating compositions disclosed herein may be applied to a vehicle exterior surface or substrate as a nanodiamond ceramic spray. The nanodiamond ceramic spray has features of both the liquid nanodiamond ceramic coating and the foam nanodiamond ceramic coatings described above. The nanodiamond ceramic spray can be applied to both wet and dry vehicle exterior surfaces. One spray of the nanodiamond ceramic spray can cover a relatively large surface area. The nanodiamond ceramic spray is a versatile product that can be easily applied to and used to protect all vehicle exterior surfaces, including glass, plastic trim, chrome, moldings, and wheels.

With the benefit of this disclosure, those skilled in the art will recognize that the percentage by weight of the above components may be modified in a manner that still protects and enhances the appearance of a wide variety of vehicle exterior materials. Those skilled in the art, having the benefit of this disclosure, will recognize that the percentage by weight of the high viscosity amino functional silicone fluid, the surface modified colloidal silica, and the nanodiamond slurry may be modified in a manner that will still protect and enhance vehicle exterior materials made of traditional materials, such as rubber, vinyl, painted metals and metal alloys, and glass, and newer materials, such as carbon fiber, aluminum, and innovative types of plastic.

In an aspect of the disclosure, the coating composition is substantially devoid of volatile organic compounds (see e.g., California Code of Regulations Title 17, Article 2, Sections 94509, 94510, OTC (Ozone Transport Commission), LADCO (Lake Michigan Air Directors Consortium), and CARB's (California Air Resources Board)). In accordance with the disclosure, substantially devoid of VOCs means sufficiently devoid of VOCs to the extent that the percent of VOCs by weight in the composition is less than about 2%.

The benefits of the compositions and methods of the disclosure are unexpected in that the compositions and methods are more user-friendly than conventional compositions and methods that require use multitude of different protective coating compositions specific for different types of vehicle exterior surfaces.

Those of skill in the art will recognize that in accordance with the disclosure any of the features and/or options in one embodiment or example can be combined with any of the features and/or options of another embodiment or example.

The disclosure herein has been described with reference to various embodiments, but it should be understood that the features of the disclosure are susceptible to modification, alteration, changes or substitution without departing significantly from the spirit of the disclosure. Accordingly, the specific embodiments described herein are for illustrative purposes only and the disclosure is not limited except by the following claims and their equivalents.

I claim:

1. A composition comprising by weight:
98.733% amino functional silicone fluid;
0.01% surface modified colloidal silica;
0.001% nanodiamond slurry; and
0.500% surface microbiocide;
with the remainder of the composition comprising one or more components selected from the group consisting of a fragrance and a dye;
wherein the composition upon application and curing on a vehicle exterior surface, is characterized by providing a protective coating and enhancing the gloss and slickness of each treated vehicle exterior surface, including rubber, vinyl, metal, metal alloys, chrome, glass, carbon fiber, aluminum, plastic made from renewable sources, and plastic made from non-renewable sources, than without said application and curing.

2. The composition of claim 1, wherein the surface modified colloidal silica has a nominal silica particle size of about 20 nanometers.

3. The composition of claim 1, wherein the surface modified colloidal silica has a pH at 25° C. of about 3.

4. The composition of claim 1, wherein the surface modified colloidal silica has a silica by weight percent of about 30%.

5. The composition of claim 1, wherein the surface modified colloidal silica has a viscosity at 25° C. of about 5 centipoise.

6. The composition of claim 1, wherein nanodiamond slurry comprises deionized water.

7. The composition of claim 6, wherein the nanodiamond slurry comprises less than or equal to 5% by weight diamond, and greater than or equal to 95% by weight deionized water.

8. The composition of claim 1, wherein the microbiocide comprises 5-chloro-2-methyl-4-isothiazolin-3-one and 2-methyl-4-isothiazolin-3-one.

9. The composition of claim 1, wherein the composition is substantially devoid of any volatile organic compound.

10. The composition of claim 1, wherein the composition further comprises by weight:
    0.7500% fragrance; and
    0.0060% at least one dye.

11. The composition of claim 10, wherein the microbiocide comprises 5-chloro-2-methyl-4-isothiazolin-3-one and 2-methyl-4-isothiazolin-3-one.

12. The composition of claim 10, wherein the nanodiamond slurry comprises deionized water, wherein the nanodiamond slurry comprises less than or equal to 5% by weight diamond, and greater than or equal to 95% by weight deionized water.

13. The composition of claim 1, wherein the composition is devoid of any volatile organic compound.

14. The composition of claim 10, wherein the composition is substantially devoid of any volatile organic compound.

15. The composition of claim 10, wherein the composition is devoid of any volatile organic compound.

16. A composition comprising by weight: 94.6276% deionized water; 2.0000% amino functional silicone fluid; 0.0010% surface modified colloidal silica; 0.0010% nanodiamond slurry; and 0.500% microbiocide; with the remainder of the composition comprising one or more components selected from the group consisting of glacial acetic acid, isopropyl alcohol, polydimethylsiloxane emulsion, UV blocker/absorber, liquid hindered amine light stabilizer, a fragrance, and a dye; wherein the composition is devoid of any volatile organic compound; wherein the composition upon application and curing on a vehicle exterior surface, is characterized by providing a protective coating and enhancing the gloss and slickness of each treated vehicle exterior surface, including rubber, vinyl, metal, metal alloys, chrome, glass, carbon fiber, aluminum, plastic made from renewable sources, and plastic made from non-renewable sources, than without said application and curing.

17. The composition of claim 16, wherein the composition further comprises by weight:
    0.0500% glacial acetic acid;
    2.000% isopropyl alcohol;
    1.000% polydimethylsiloxane emulsion;
    0.0100% UV blocker/absorber;
    0.0100% liquid hindered amine light stabilizer;
    0.0500% fragrance; and
    0.0004% dye.

18. A method comprising:
    (a) applying a coating composition to a vehicle exterior surface; and
    (b) allowing the coating composition to cure on the vehicle exterior surface;
    wherein the coating composition comprises by weight:
        94.6276% deionized water;
        2.0000% amino functional silicone fluid;
        0.0010% surface modified colloidal silica;
        0.0010% nanodiamond slurry; and
        0.2500% microbiocide;
        with the remainder of the composition comprising one or more components selected from the group consisting of glacial acetic acid, isopropyl alcohol, polydimethylsiloxane emulsion, UV blocker/absorber, liquid hindered amine light stabilizer, a fragrance, and a dye;
    wherein the composition is devoid of any volatile organic compound;
    wherein the composition upon application and curing on a vehicle exterior surface, is characterized by providing a protective coating and enhancing the gloss and slickness of each treated vehicle exterior surface, including rubber, vinyl, metal, metal alloys, chrome, glass, carbon fiber, aluminum, plastic made from renewable sources, and plastic made from non- renewable sources, than without said application and curing.

19. The method of claim 18, wherein the wherein the coating composition further comprises by weight:
    0.0500% glacial acetic acid;
    2.000% isopropyl alcohol;
    1.000% polydimethylsiloxane emulsion;
    0.0100% UV blocker/absorber;
    0.0100% liquid hindered amine light stabilizer;
    0.0500% fragrance; and
    0.0004% dye.

* * * * *